United States Patent [19]
Rossini

[11] Patent Number: 5,286,332
[45] Date of Patent: Feb. 15, 1994

[54] APPARATUS FOR APPLYING AN L CLIP TAPE TO A CARTRIDGE

[75] Inventor: Steven J. Rossini, St. Paul, Minn.

[73] Assignee: Minnesota Mining and Manufacturing Company, St. Paul, Minn.

[21] Appl. No.: 975,161

[22] Filed: Nov. 12, 1992

Related U.S. Application Data

[63] Continuation of Ser. No. 580,071, Sep. 10, 1990, abandoned.

[51] Int. Cl.⁵ .............................................. B32B 31/00
[52] U.S. Cl. ..................................... 156/510; 156/543; 156/527; 156/468; 53/136.4
[58] Field of Search ............. 156/510, 543, 527, 552; 53/136.4; 242/6, 64, 65, 67.1, 75

[56] References Cited

U.S. PATENT DOCUMENTS

| Re. 22,418 | 1/1944 | Salfisberg | 216/29 |
|---|---|---|---|
| 2,515,130 | 7/1950 | Locke et al. | 216/21 |
| 2,543,004 | 2/1951 | Dewyer | 216/21 |
| 2,596,158 | 5/1952 | Lindsey | 216/21 |
| 2,630,933 | 3/1953 | Charles | 216/21 |
| 3,700,305 | 10/1972 | Bingham | 350/105 |
| 3,798,108 | 3/1974 | Ioannilli | 156/510 |
| 3,801,183 | 4/1974 | Sevelin et al. | 350/105 |
| 4,044,527 | 8/1977 | Ulrich et al. | 53/136.4 |
| 4,099,838 | 7/1978 | Cook et al. | 350/105 |
| 4,120,741 | 10/1978 | Linnér | 53/136.4 |
| 4,240,867 | 12/1980 | Diegel | 156/543 |
| 4,268,983 | 5/1981 | Cook | 40/2.2 |
| 4,311,544 | 1/1982 | Salonek et al. | 156/510 |
| 4,427,144 | 1/1984 | Macgrory et al. | 225/7 |
| 4,562,773 | 1/1986 | Diggle | 156/384 |
| 4,738,075 | 4/1988 | Marchetti | 53/136.4 |
| 4,781,782 | 11/1988 | Luhman et al. | 156/361 |
| 4,789,418 | 12/1988 | Rayl | 156/468 |
| 4,889,581 | 12/1989 | Ulrich et al. | 53/136.4 |

FOREIGN PATENT DOCUMENTS 0325855  8/1989  European Pat. Off. ...... B65H 35/07

Primary Examiner—Patrick J. Ryan
Assistant Examiner—Merrill Dixon
Attorney, Agent, or Firm—Gary L. Griswold; Walter N. Kirn; Mark W. Binder

[57] ABSTRACT

An apparatus for applying a tape onto a cartridge includes a frame and a rotatable tape roll support mounted on the frame. A pivoting tape applying arm is mounted on the frame and a pair of nip rollers are mounted on the lower end of the tape applying arm. The nip rollers allow linered tape movement only in the direction away from the tape roll. Tape unwinds from the tape roll only in response to movement of the tape applying arm after tape has been applied and before the next application. The tape travels from the tape roll, through the nip rollers and along the tape applying arm before a pin mounted on the applying arm strips the tape from its liner. A paddle then tacks the tape onto the cartridge and a buff roller presses the tape against the cartridge to insure adhesion. A cutter fixed on the frame cuts the applied tape and includes an electrically heated wire mounted in a sleeve with a ceramic backup component.

12 Claims, 5 Drawing Sheets

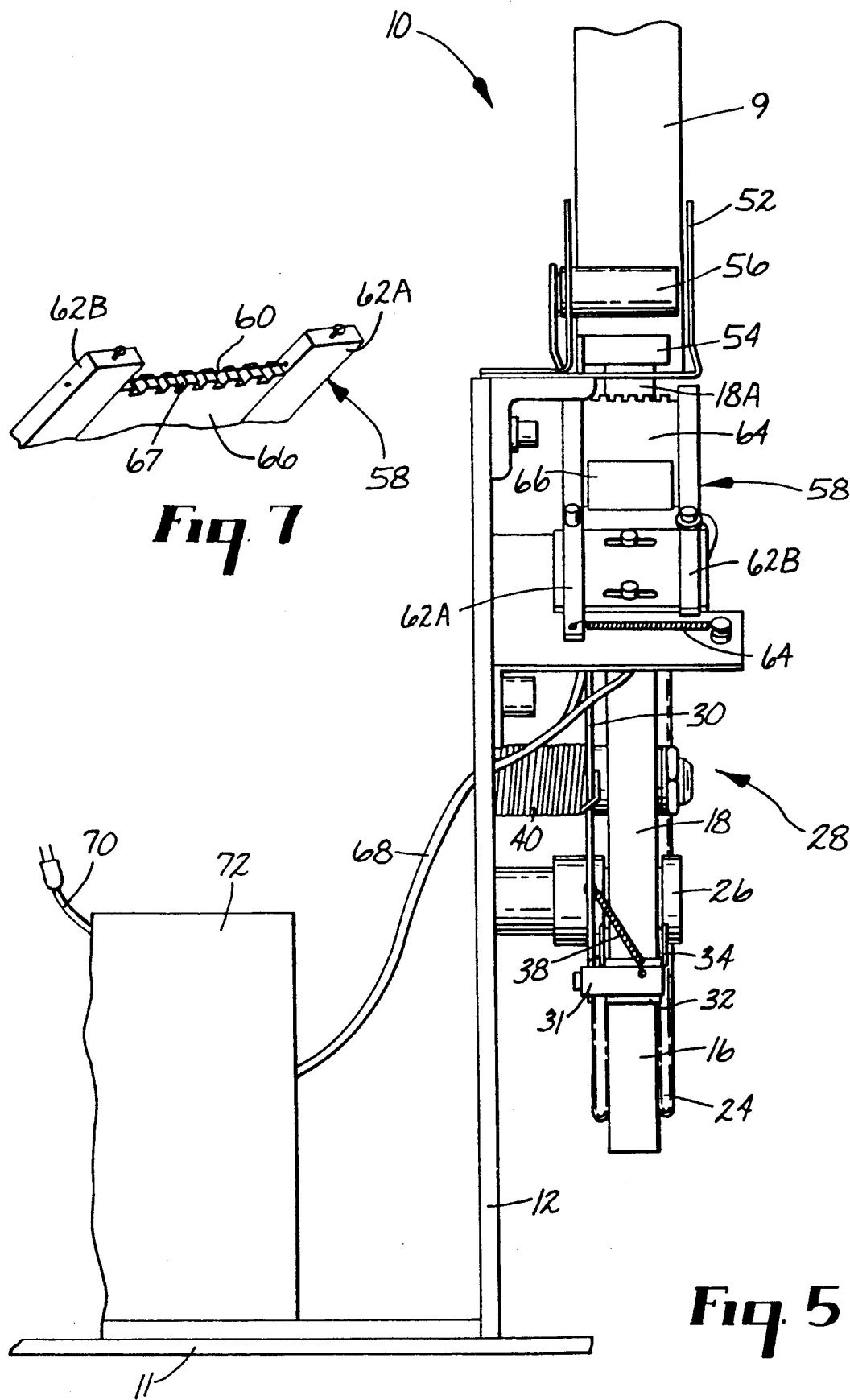

APPARATUS FOR APPLYING AN L CLIP TAPE TO A CARTRIDGE

This is a continuation of application Ser. No. 07/580,071 filed Sep. 10, 1990, now abandoned.

TECHNICAL FIELD

The present invention relates to an apparatus for applying tape to one corner of a rectangular cartridge. More particularly, the present invention relates to an apparatus which applies fragile linered tapes to one corner of a tape cartridge.

BACKGROUND OF THE INVENTION

Apparatus for automatically applying tape to a surface are well known. A product to be taped is moved in a path, either manually or automatically, and intersects the path of the tape to be applied The tape is taken from a tape source such as a roll and is moved to its application position typically by a series of arms and rollers. The arms may be dancer arms which accumulate tape or other pivoting arms which reduce the inertia on the tape roll to reduce the tension on the tape being applied U.S. Pat. No. 4,789,418 to Rayl is representative of tape applicating machines in which one way rollers prevent reverse tape movement and a stationary or movable knife is used to cut applied tape.

Dewyer, U.S. Pat. No. 2,543,004 discloses an apparatus which applies adhesive transfer tape onto an object using a series of rollers, one of which is activated by a brake to control advance of tape. Unwinding of the tape is controlled by a motor which also combines with a dancer arm to regulate the unwind tension of the tape. The tape is held in position for application by a vacuum wheel and a blade-type cutter severs the tape. This vacuum-using apparatus is very complex and expensive.

Shipping and other containers are commonly sealed by applying L-shaped clips of adhesive tape over a corner of the container. Various devices for applying L clips to containers include automatic applicators which operate in conjunction with a conveyer for applying L clips to a container as the container moves past the applicator. Typical L clip applicators, such as the one disclosed in Locke et al., U.S. Pat. No. 2,515,130, include an applicator arm for applying tape to a container conveyed past the applicator arm, a blade for cutting the adhesive tape into segments, and a buffer assembly for pressing the segments into contact with the container. The Locke tape dispenser applies tape around the corners of boxes. This apparatus is not suitable for applying fragile linered tape.

An applicator for automatically applying two L clips in line is disclosed in copending U.S. patent application Ser. No. 307,681 filed on Feb.6, 1989 by Ramacier and assigned to the assignee of the present invention. In the Ramacier application an actuator selectively increases the tension on the tape during cutting and decreases the tension at other times. However, this apparatus is not designed for use with fragile linered tape.

Luhman et al., U.S. Pat. No. 4,781,782 discloses an applicator for applying a tape to a stationary surface using a dancer roll. The tape is a linered pressure sensitive adhesive and the liner is stripped from the adhesive to be wound on a take-up reel before the tape is applied. A knife is used to cut the tape. However, this applicator is also not designed for use with fragile linered tape, can not apply L clips, and is relatively complex.

No known, simple, inexpensive apparatus can take a fragile linered tape which includes a tearable film adhered to a support sheet and a removable liner adhered to the tape for storing the tape, strip off the liner, and apply the linerless tape onto a product without stretching or otherwise damaging the tape during application. Moreover, fragile linered tape can not be pulled taut or cut with a conventional blade-type knife as the tension and shear forces would damage or destroy the tape. Scissors and crush cut type cutters are expensive to manufacture and use oil or other detackifying agents which contaminate the tape. Hot wire cutters may be used to sever the tape from a tape roll. Known hot wire cutting tools, such as the wire cutter disclosed in U.S. Pat. No. 4,427,144 to Macgrory et al., use high tensions and low temperatures which result in relatively long cutting times These long cutting times frequently yield improper cutting of the web and sometimes are insufficient to cut the web at all at the higher operating speeds that are compatible with the process speeds common in the industry. Operating at high temperatures would distort the wire and likely impair the ability of the wire to cut.

SUMMARY OF THE INVENTION

The present invention is an improved apparatus for applying a linered tape from a roll around one corner of a tape cartridge to identify the cartridge. The apparatus includes a frame and a rotatable tape roll support mounted on the frame which supports the tape roll for rotational motion to dispense the tape. The tape roll support includes an unwind drum and a low inertia tape container which support the tape roll without subjecting the tape roll to unwind inertia levels which damage the tape. The low inertia tape container preferably includes a low weight wire frame which locks the tape roll in position and prevents telescoping of the tape roll.

The unwind friction and the inertia of the tape roll support and the tape roll are prevented from exceeding the plastic elongation tension of the tape and from damaging the tape. This is accomplished by a pivoting tape applying arm and a pair of nip rollers mounted on the lower end of the tape applying arm. The linered tape passes through the nip rollers before traversing the tape applying arm. The nip rollers also serve to maintain tension on the linered tape between the nip rollers and the point of liner removal and through the short segment of tape unsupported by the liner to the point of application. A clutch connected to one of the nip rollers allows tape movement only in the direction away from the tape roll The tape applying arm pivots between a first or rest position and a second position. A spring creates a bias to return the arm from the second to the first position. As the cartridge to be taped moves the pivot arm from the first position to the second position, tape is drawn from the arm onto the cartridge. With this motion, tape is drawn onto the arm without further unwinding of the tape from the tape roll. Movement of the tape applying arm from the second position to the first position unwinds linered tape from the tape roll in preparation for the next application.

A stripper pin is mounted on the applying arm and removes the liner from the tape. The liner is freely flowable into a receptacle. The apparatus also includes a crease and V roller set mounted on the upper end of the applying arm above the stripper which places a longitudinal fold in the tape to impart stiffness in the tape to prevent the tape from falling over.

A cutter cuts a portion of the stripped tape from the tape supply roll and includes an electrically heated wire mounted between two posts or in a sleeve to compensate for thermal expansion of the wire. A ceramic backup component permits the wire to heat to high temperatures while preventing wire distortion due to the motion of the tape past the wire as well as thermal distortion. A paddle mounted on the upper end of the tape applying arm initiates the application of the tape onto the corner of the cartridge. A buff roller mounted above the paddle on the upper end of the tape applying arm presses the vertical leg of the L clip and applies the horizontal leg of the L clip to the cartridge.

BRIEF DESCRIPTION OF THE DRAWINGS

FIG. 5 is a side view of the applying apparatus of FIG. 1.

FIG. 7 is a perspective view of the cutter subsystem of the apparatus of FIG. 1.

DETAILED DESCRIPTION OF PREFERRED EMBODIMENTS

Figure 1:
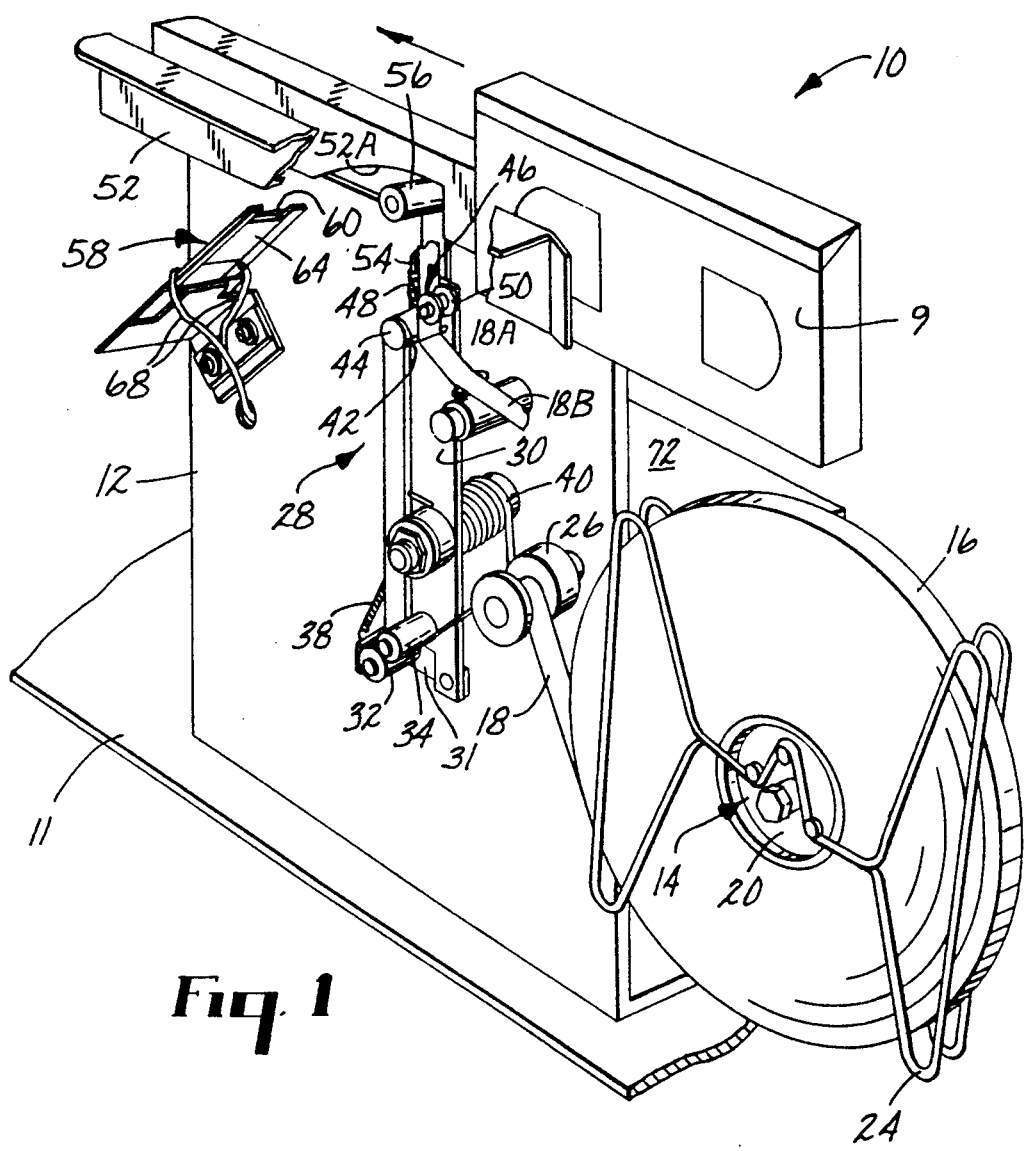
FIG. 1 is a perspective view of the applying apparatus according to one embodiment of the present invention showing the applying arm in the first position.
Figure 6:
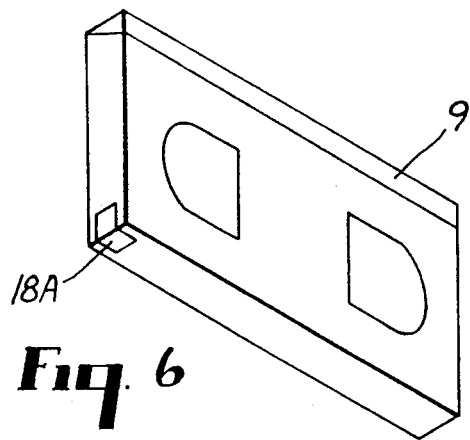
FIG. 6 is a perspective view of a cartridge after application of the L clip.

FIG. 1 is a perspective view of the apparatus for applying a linered tape from a roll around one corner of an object according to one embodiment of the present invention. Although the object need not be rectangular or have right-angled corners, the apparatus is designed especially for video tape cartridges having these features. The tape is applied to the cartridge corner forming an "L" shape and is referred to as an L clip. This L clip is used on video tape cartridges as a tamper-resistant seal to identify the cartridge as one made by an authorized maker to thereby distinguish authorized cartridges from unauthorized, pirated, or bootleg cartridges.

The tape used for these applications is a fragile linered tape which includes a tearable film adhered to a support sheet, and a removable liner adhered to the tape for storing the tape. The adhesive used to adhere the liner to the tape is also used to adhere the tape to an object. The tape may be formed of glass beads or other microspheres on a backing, which may include one or more transparent layers, such as latex Such tapes are disclosed in U.S. Pat. No. 3,700,305 to Bingham, U.S. Pat. No. 3,801,183 to Sevelin et al., U.S. Pat. No. 4,099,838 to Cook et al., and U.S. Pat. No. 4,268,983 to Cook, all of which are assigned to the assignee of the present invention. The specifications of these patents are incorporated by reference herein. This type of tape is highly tamper resistant as it can not be removed without being mutilated, and it is difficult to replicate. The tape can not be pulled taut or cut with a conventional blade-type knife as the tension imparted to the tape by this type of cutting operation would stretch the tape and change its cosmetic appearance and retroflective graphics. Known tape applying machines which handle this type of tape are costly to manufacture, are difficult to operate, and require an adhesive or detackifier to be used on the cutting apparatus. The apparatus of the present invention was developed to handle this very fragile tape.

The applying apparatus 10 includes a frame 12, which is mounted on a base 11 and can be any convenient shape or size, and a rotatable tape roll support 14 mounted on the frame 12. The support 14 supports a tape roll 16 for rotational motion to dispense the linered tape 18. The linered tape 18 includes tape 18A and a liner 18B which is stripped from the tape 18A prior to application. The tape roll support 14 includes an unwind drum 20 on which the tape roll 16 is mounted, and a low inertia tape container which supports the tape roll 16 without subjecting the tape roll 16 to unwind inertia levels which damage the tape 18. The low inertia tape container preferably includes a low weight wire frame 24 which locks the tape roll 16 in position and prevents telescoping of the tape roll 16. By using a low inertial wire frame 24, weaker tapes, less resistant to tension stresses, such as the fragile tapes described above, can be applied. Alternatively, the tape roll support 14 can include a conventional sheet metal side shield, although such containers are heavier and have more inertia than the illustrated support 14 can be more expensive to manufacture.

Figure 2:
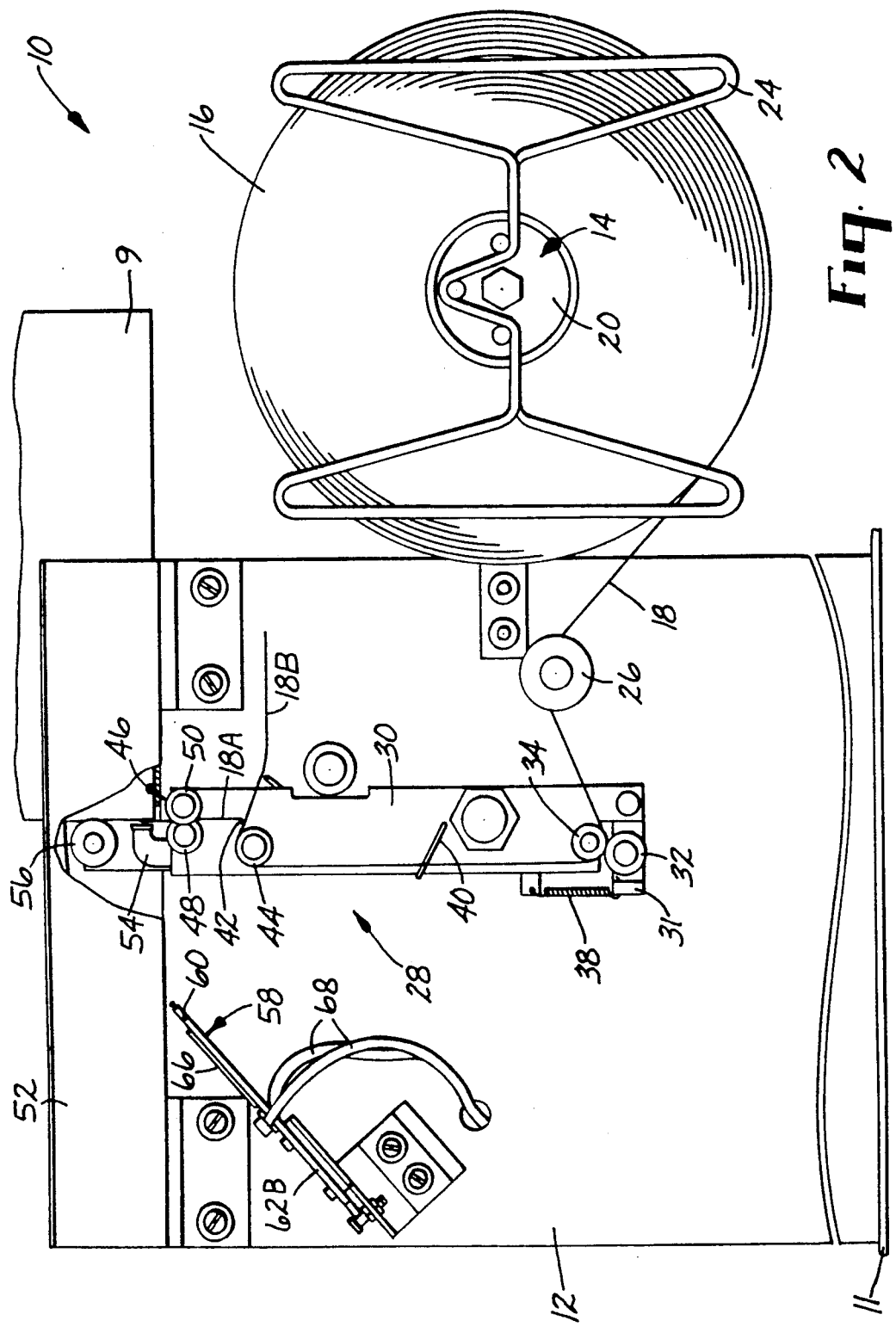
FIG. 2 is a front view of the applying apparatus of FIG. 1.

An idler roller 26 is mounted on the frame 12 adjacent the support 14. The linered tape 18 passes around the idler roller 26 after unwinding from the tape roll 16. The linered tape 18 preferably unwinds from the bottom of the tape roll 16 and winds over the idler roller 26 as illustrated in FIGS. 1 and 2.

An applying arm apparatus 28 is mounted on the frame 12 adjacent the idler roller 26. The applying arm apparatus 28 prevents the unwind friction and the inertia of the tape roll 16 and the tape roll support 14 from exceeding the plastic elongation tension of the tape 18 and from being transmitted to and damaging the tape 18A being applied This applying arm apparatus 28 includes a pivoting tape applying arm 30 and a pair of nip rollers 32, 34 which are mounted on the lower end of the applying arm 30 as illustrated in FIGS. 1 and 2. The linered tape 18 passes through the nip between the nip rollers 32, 34 before traversing the tape applying arm 30. One of the nip rollers, preferably nip roller 32, is connected to its shaft by a clutch (not shown) which is mounted inside the nip roller 32 and allows tape movement past the nip rollers 32, 34 in only the direction away from the tape roll 16. This nip roller 32 is formed with a high friction outer surface such as silicone and is biased toward the other nip roller 34 so that the nip rollers 34 act both as one way rollers and as components to control the applying tension of the tape 18. This applying tension is adjusted to effect optimum cutting and to prevent overtravel of the tape 18 at the end of the application cycle.

The nip rollers 32, 34 are biased toward each other by mounting the nip roller 32 on an arm extension 31 which pivots on the end of the applying arm 30. The nip roller 32 is biased toward the other nip roller 34 by a spring 38 connected between the free end of the arm extension 31 and the applying arm 30 The high friction outer surface of the nip roller 32 permits the use of lower spring tension in the spring 38 while maintaining the proper tension on the tape 18.

The applying tension of the tape 18A on the cartridge 9 can be adjusted with spring tension from the spring 38. Using ½ inch tape, the minimum tension required to strip the liner 18B from the tape 18A is about 1.5 N/dm (40 gm). At approximately 3.9 N/dm (100 gm), the tape stretches, although at this higher application tension better cutting is achieved Thus, an applying tension between 1.5 N/dm (40 gm) and 3.9 N/dm (100 gm) is used. Preferably, 3.5 N/dm (90 gm) of tension are used to provide a high level of cutting consistency while providing an adequate safety margin for tape damage. With one inch tape, the above tension limits are doubled due to the doubling of the tape width.

Figure 3:
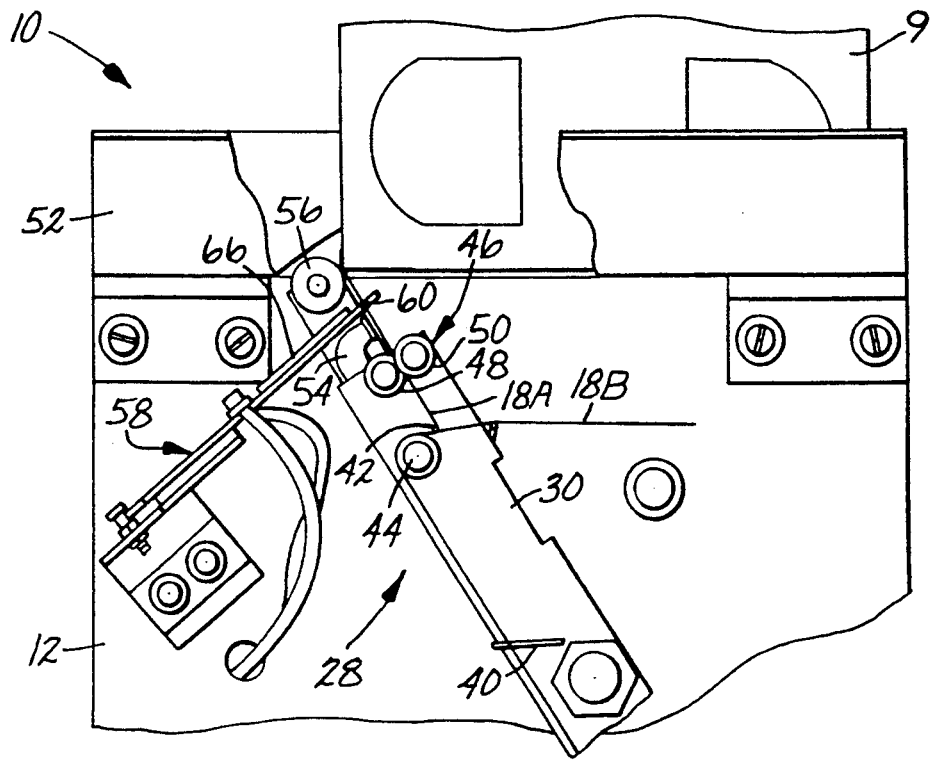
FIG. 3 is a partial front view of the applying apparatus of FIG. 1 showing the applying arm intermediate the first and second positions.
Figure 4:
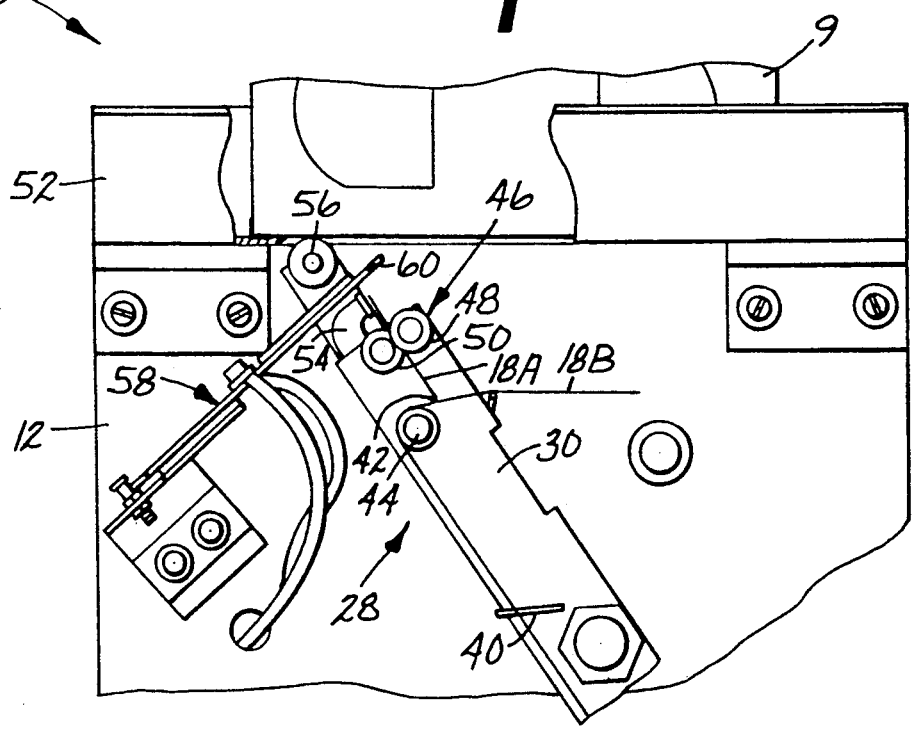
FIG. 4 is a partial front view of the applying apparatus of FIG. 1 showing the applying arm in the second position.

The tape applying arm 30 pivots between a first or rest position, shown in FIGS. 1 and 2, and a second position, shown in FIG. 4. FIG. 3 shows the tape applying arm 30 in a position intermediate the first and second positions just before cutting of the tape 18A begins. A spring 40 or other biasing device biases the tape applying arm 30 toward the first position Once tape 18A is initially applied onto a cartridge 9 as explained below, movement of the cartridge 9 pivots the tape applying arm 30 from the first position to the second position. This movement pulls the tape 18A with sufficient force to overcome the force required to strip the liner 18B from the tape 18A, to overcome the friction in the nip of the nip rollers 32, 34 and to draw tape 18 previously unwound from the tape roll 16 through the nip rollers 32, 34. As the motion of the tape applying arm 30 from the first position to the second position moves the lower end of the applying arm 30 toward the tape roll support 14, no additional tape 18 is unwound from the tape roll 16. After the application of tape 18A onto the cartridge 9, movement of the tape applying arm 30 from the second position back to the first position by the spring 40 unwinds linered tape 18 from the tape roll 16 in preparation for the next tape application. Movement of the tape applying arm 30 back to the first position does not pull tape 18 through the nip rollers 32, 34 as this movement does not generate sufficient force to overcome the friction in the nip of the nip rollers 32, 34. Thus, the unwind friction and the inertia on the tape roll 16 and the tape roll support 14 are not transmitted to the tape 18A being applied on the cartridge 9.

A stripper, including a pin 42 around which the tape 18A passes while the liner 18B does not, strips the liner 18B from the tape 18A after the linered tape 18 passes around an idler roller 44. The pin 42 is fixed onto the tape applying arm 30. The liner 18B is freely flowable into a receptacle (not shown) or other disposal device.

Figure 8:
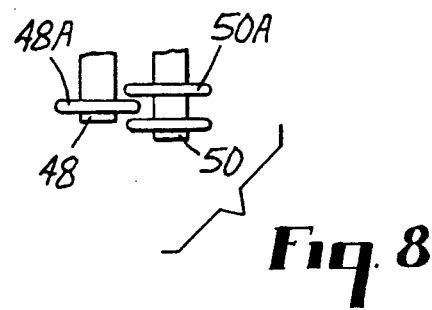
FIG. 8 is a top view of the crease and V roller set.

The applying apparatus 10 also includes a crease and V roller set 46 mounted on the upper end of the applying arm 30 above the stripper pin 42. The crease and V roller set 46 places a longitudinal fold in the tape 18A to stiffen the tape 18A to prevent the tape 18A from falling over with the completion of the pivot arm 30 motion from the second to the first positions. The crease and V roller set 46 includes a crease roller 48 and a V roller 50, both of which are idler rollers The crease roller 48 has a relatively sharply pointed axially central portion 48A as shown in FIG. 8 which complementarily meshes with the two enlarged diameter portions 50A of the V roller 50. The enlarged diameter portions 50A are formed of rubber, silicone, or plastic washer-like members The complementary fit between the pointed central portion 48A and the enlarged diameter portions 50A places the fold in the tape 18A.

Tape 18 can be applied to any objects having flat vertical and horizontal surfaces moving at a continuous velocity of up to 12.2 meters per minute (40 feet per minute). The object can be moved manually, semi-automatically, or automatically, and need not move at a uniform velocity. Where the object is moved automatically, a conveyer is used to physically carry the object passed the tape. Additionally, the tape roll support 14 would be driven to feed tape 18. As discussed throughout this specification, the object to be taped is intended to be a video tape cartridge 9 although other cartridges and other objects can be taped. As the cartridge 9 moves along a horizontal plane in the illustrated orientation, the cartridge 9 is guided by a guide 52 which is substantially U-shaped in cross section as shown in FIG. 1. The guide 52 permits the cartridge corner to slide across the tape 18A to properly apply the tape 18A. During this movement, the cartridge 9 first contacts and is tacked to the tape 18A by an applying paddle 54 which is mounted to the upper end of the applying arm 30 above the crease and V roller set 46. Additionally, continued motion of the cartridge 9 to which the tape 18A is tacked rotates the pivoting applying arm 30 from the first position, shown vertically in FIGS. 1 and 2, to the second position, shown as an approximately 45° angle with the vertical in FIG. 4. This movement draws the linered tape 18 through the nip rollers 32, 34 so that the tape 18A can be applied to the cartridge 9.

A buff roller 56 is pivotably mounted on the upper end of the applying arm 30 above the applying paddle 54. The buff roller 56 presses the applied tape 18A against the corner of the cartridge 9 to ensure adhesion. The buff roller 56 is an idler roller and, during application of the L clip, first presses the tape 18A against the vertical surface of the cartridge. Movement of the cartridge 9 through the guide 52 causes the buff roller 56 to apply the vertical leg of the L clip and then roll around the corner of the cartridge 9 to apply the horizontal leg of the L clip as the applying arm 30 pivots from the first to the second positions. The buff roller 56 remains in this inclined position (the second position of the applying arm 30) in contact with the horizontal surface of the cartridge 9 until the trailing end of the cartridge 9 moves past the buff roller 56 and the applying arm 30 returns to its second position. The rear wall of the tape guide 52 has a curved cutout portion 52A which receives and permits the buff roller 56 to move with the applying arm 30 between the first and second positions of the applying arm 30.

A cutter 58 cuts a portion of tape 18A from the tape extending from the tape roll 16. The cutter 58 is mounted on the frame 12 in the tape path at the position of pivot arm motion where the tape 18A spans the corner of the cartridge 9 and the paddle 54. The cutter 58 includes an electrically heated wire 60 which cuts the adhesive tape 18A by heating to temperatures of over 700° C. and melting through the tape 18A without damaging the tape 18A. The wire 60 is preferably a standard nichrome wire of approximately 0.5 mm diameter, which consumes approximately fifteen to thirty watts of power at six volts to properly cut ½ inch tape.

The wire 60 spans between two arms 62A, 62B, and the arm 62A can pivot to compensate for thermal expansion of the wire 60. A low tension is applied to the wire 60 by a spring 64 connected between the wire 60 and the arm 62A. This prevents distortion of the wire 60 due to both the motion of the tape 18A past the wire 60 and the effects of gravity, as the tension counterbalances gravity and provides better cutting. A ceramic backup 66 permits high forces to be applied to the heated wire 60 from the tape 18A while preventing wire distortion due to the motion of the tape 18A past the wire 60 during cutting. As the tape 18A presses against the wire 60, the wire 60 presses against the ceramic backup 66. If this hot wire were under more than a minimal tension, when heated the wire would break as tensile strength is reduced upon heating. The ceramic backup 66 is designed to provide adequate support for the wire 60 with a minimal contact area therebetween to minimize thermal conductive heat losses from the wire 60 to the backup 66. Serrations 67 provide spaced supports for the wire 60 and reduce the contact area. The backup 66 can be as narrow as the tape 18A. Either AC or DC power can be used. As illustrated in the figures, the heated wire 60 is connected to lead wires 68 which lead to the output side of a step down transformer 72, to an AC power cord 70. which lowers the voltage as necessary to yield the desired power requirements.

Figure 9:
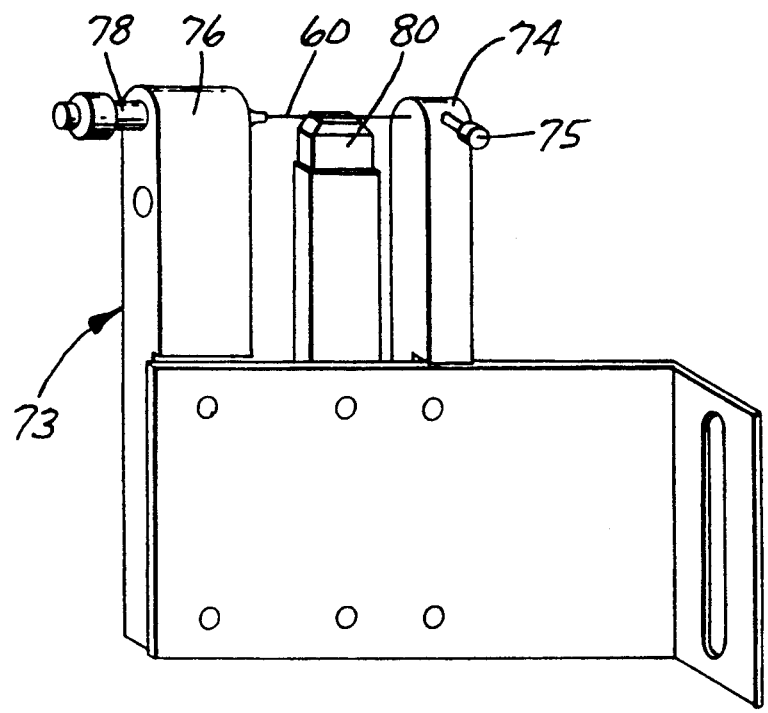

In an alternative embodiment of the cutter shown in FIG. 9, the cutter 73 includes a wire 60 mounted between two arms 74, 76. Both arms 74, 76 are stationary. The wire 60 is rigidly fastened to the arm 74 via a screw 75 but is mounted at the other end to the arm 76 through a sleeve 78 so that the wire 60 is free to move, at least slightly, in all three directions. Between the two arms 74, 76, the wire 60 is supported by a ceramic backup 80. In this embodiment, the ceramic backup 80 extends for a shorter distance along the wire 60, as compared with the backup 66 of FIG. 7. The three dimensional movement of the wire 60 in the sleeve 78 permits thermal expansion of the wire 60 without distorting or damaging the wire 60 during use.

The applying apparatus 10 can be fully automatic or the cartridges 9 can be manually fed through the tape guide 52. The only manual step is the initial threading of the linered tape 18 along the tape path. The tape path extends from the tape roll 16 on the tape roll support 14, over the idler roller 26, and to the pressure preventing applying arm apparatus 28. The linered tape 18 then passes between the nip rollers 32, 34 on the applying arm 30, along the applying arm 30 and over the idler roller 44. The linered tape 18 then passes around the stripper pin 42 after which the liner 18B extends out of the tape path to a receptacle and the tape 18A continues to the crease and V roller set 46. The tape 18A travels between the crease roller 48 and the V roller 50 along the tape path before it passes in front of the applying paddle 54 and the buff roller 56. As a cartridge 9 passes through the tape guide 52, the tape is applied as described above.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although the applying apparatus 10 has been illustrated and described as being operated by running a cartridge across the top of the apparatus, the apparatus can be oriented oppositely with the cartridge run along the bottom of the apparatus. Additionally, modifications can be made so that the cartridge is stationary while the applying arm apparatus 28 moves within a frame and around the cartridge to apply tape.

I claim:

1. An apparatus for applying a fragile linered tape from a linered tape roll onto at least one surface of an object as the object is moved relative to the apparatus, wherein the tape includes a tearable film adhered to a support sheet, and a removable liner adhered to the tape such that the adhesive used to adhere the liner to the tape is also used to adhere the tape to an object, the apparatus comprising:

a frame;

a tape roll support mounted on the frame for rotatably supporting the linered tape roll to dispense the tape;

means mounted on the frame for stripping the liner from the tape before the tape is applied;

means for cutting a portion of stripped tape from the linered tape extending from the tape roll;

means for applying the tape onto the object, wherein the applying means applies the tape after the liner is stripped from the tape by the stripping means, and the relative movement of the object to the applying means pulls the tape from the apparatus; and means for permitting a quantity of tape to be dispensed from said apparatus and applied to an object by said applying means without unwinding of linered tape from the linered tape roll, and for unwinding a quantity of linered tape from the linered tape roll after the tape application is complete to thereby isolate the unwind friction and inertia of the tape roll and tape roll support from the tension on the tape during application after the liner is stripped from the tape.

2. The apparatus of claim 1 wherein the tension preventing means comprises:

a pivoting tape applying arm having upper and lower ends;

a pair of nip rollers mounted on the lower end of the tape applying arm through which the linered tape passes before traversing the tape applying arm;

means for maintaining tension on the linered tape between the tape roll and the nip rollers; and means including a clutch connected to at least one of the nip rollers for allowing linered tape movement in only the direction away from the tape roll;

wherein the tape applying arm is pivotable between a first position and a second position, such that pivoting of the applying arm from the first position to the second position draws tape through the nip rollers so that none of the unwind friction or the inertia of the tape roll and the tape roll support is transmitted to the tape being applied, and pivoting of the tape applying arm from the second position to the first position unwinds linered tape from the tape roll in preparation for the next application.

3. The apparatus of claim 2 wherein the stripping means comprises a pin mounted on the tape applying arm around which the tape passes while the liner does not, the liner being freely flowable into a receptacle.

4. The apparatus of claim 2 wherein the tension maintaining means comprises means for biasing the nip rollers together.

5. The apparatus of claim 1 wherein the cutting means further comprises:

a pair of arms for receiving a heated wire therebetween;

means for tensioning the wire to compensate for thermal expansion of the wire and maintain the wire straight at the operating temperature; and a ceramic backup component disposed along at least part of the length of the heated wire which permits the heated wire to operate at high temperatures while preventing distortion of the wire due to the motion of the tape past the wire.

6. The apparatus of claim 5 wherein the ceramic backup is serrated to reduce the contact area between the wire and the ceramic backup to minimize thermal conductivity away from the wire.

7. The apparatus of claim 5 wherein one of the arms of the cutting means is movable and the tensioning means further comprises biasing means connected to the movable arm for maintaining minimal tension on the heated wire to prevent distortion of the wire due to the effects of gravity.

8. The apparatus of claim 1 wherein the tape roll support comprises an unwind drum on which the tape roll is mounted, and a low inertia tape container which supports the tape roll without unduly increasing the inertia at the tape roll, wherein the low inertia tape container comprises a low weight wire frame which locks the tape roll in position and prevents telescoping of the tape roll.

9. The apparatus of claim 2 further comprising a guide fixed to the top of the frame and which aligns the object such that the surface to be taped can be slid across the tape to properly apply the tape; and wherein the applying means comprises a buff roller mounted on the upper end of the applying arm for pressing the applied tape against the object to insure adhesion.

10. The apparatus of claim 2 further comprising a crease and V roller set mounted on the upper end of the applying arm above the stripping means which places a longitudinal fold in the tape to stiffen the tape to prevent the tape from falling over and assist movement of the tape.

11. An apparatus for applying a fragile linered tape from a linered tape roll around one corner of a cartridge, wherein the tape includes a tearable film adhered to a support sheet, and a removable liner adhered to the tape such that the adhesive used to adhere the liner to the tape is also used to adhere the tape to an object, the apparatus comprising:

a frame;

a tape roll support rotatably mounted on the frame for supporting the linered tape roll for rotational motion to dispense the tape, wherein the tape roll support comprises an unwind drum on which the tape roll is mounted, and a low inertia tape container which supports the tape roll without unduly increasing the inertial at the tape roll;

means mounted on the frame for cutting a portion of stripped tape from the linered tape extending from the tape roll comprising a heated wire;

a guide fixed to the top of the frame which aligns the cartridge such that the corner to be taped can be slid across the tape to properly apply the tape;

means for permitting a quantity of tape to be dispensed from said apparatus and applied to an object by said applying means without unwinding of linered tape from the linered tape roll, and for unwinding a quantity of linered tape from the linered tape roll after the tape application is complete to thereby isolate the unwind friction and inertia of the tape roll and tape roll support from the tension on the tape during application after the liner is stripped from the tape, wherein the means comprises:

a pivoting tape applying arm having upper and lower ends;

a pair of nip rollers mounted on the lower end of the tape applying arm through which the linered tape passes before traversing the tape applying arm;

means for biasing the nip rollers together to maintain tension on the linered tape between the tape roll and the nip rollers; and a clutch connected to one of the nip rollers which allows linered tape movement in only the direction away from the tape roll;

an applying paddle mounted on the upper end of the applying arm for applying the tape onto the corner of the cartridge; and a buff roller mounted on the upper end of the applying arm adjacent the cutting means, wherein the buff roller presses the applied tape against the corner of the cartridge to insure adhesion; and means mounted on the tape applying arm for stripping the liner from the tape comprising a pin around which the tape passes while the liner does not, the liner being freely flowable into a receptacle, wherein the applying means applies the tape by pulling the tape after the liner is stripped from the tape by the stripping means;

wherein the tape applying arm is pivotable between a first position and a second position, such that pivoting of the applying arm from the first position to the second position draws tape through the nip rollers so that the unwind friction and the inertia of the tape roll and the tape roll support are not transmitted to the tape being applied, and pivoting of the tape applying arm from the second position to the first position unwinds linered tape from the tape roll in preparation for the next application after the cartridge is disengaged from the preventing means such that the tape is unwound from the tape roll for the next application after the tape has been completely applied to the cartridge.

12. The apparatus of claim 11 wherein the cutting means further comprises:

a pair of arms for receiving the heated wire therebetween;

means for tensioning the wire to compensate for thermal expansion of the wire and maintain the wire straight at the operating temperature; and a ceramic backup component disposed along at least part of the length of the heated wire which permits the heated wire to operate at high temperatures while preventing distortion of the wire due to the motion of the tape past the wire; and biasing means for maintaining minimal tension on the heated wire to prevent distortion of the wire due to the effects of gravity.

* * * * *